US011029698B2

(12) United States Patent
Afrouzi

(10) Patent No.: US 11,029,698 B2
(45) Date of Patent: Jun. 8, 2021

(54) METHOD FOR TRACKING MOVEMENT OF A MOBILE ROBOTIC DEVICE

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

(*) Notice: Subject to any disclaimer, the term of this patent is extended or adjusted under 35 U.S.C. 154(b) by 531 days.

(21) Appl. No.: 15/955,344

(22) Filed: Apr. 17, 2018

(65) Prior Publication Data

US 2019/0317518 A1    Oct. 17, 2019

(51) Int. Cl.
*G05D 1/02* (2020.01)
*G06T 7/20* (2017.01)

(52) U.S. Cl.
CPC ......... *G05D 1/0246* (2013.01); *G05D 1/0268* (2013.01); *G06T 7/20* (2013.01); *G05D 1/0219* (2013.01); *G05D 2201/0203* (2013.01); *G05D 2201/0208* (2013.01); *G05D 2201/0215* (2013.01)

(58) Field of Classification Search
CPC .. G05D 1/0246; G05D 1/0268; G05D 1/0219; G05D 2201/0215; G05D 2201/0203; G05D 2201/0208; G05D 1/0253; G06T 7/20
See application file for complete search history.

(56) References Cited

U.S. PATENT DOCUMENTS

| | | | |
|---|---|---|---|
| 4,769,700 A * | 9/1988 | Pryor | A01B 69/008 348/120 |
| 6,240,652 B1 | 6/2001 | Bobel et al. | |
| 6,804,022 B2 | 10/2004 | Fujiwara et al. | |
| 7,145,130 B2 | 12/2006 | Sano | |
| 7,456,815 B2 | 11/2008 | Reime | |
| 8,386,081 B2 * | 2/2013 | Landry | G05D 1/0272 700/253 |
| 8,546,745 B2 | 10/2013 | Lippuner | |
| 8,885,884 B2 * | 11/2014 | Gene | G06T 7/20 382/103 |
| 10,380,745 B2 * | 8/2019 | Buyukozturk | G06T 7/20 |
| 10,788,836 B2 * | 9/2020 | Ebrahimi Afrouzi | B25J 9/1676 |
| 2005/0137750 A1 * | 6/2005 | Shim | G05D 1/0253 700/245 |
| 2013/0041549 A1 * | 2/2013 | Reeve | G05D 1/0278 701/28 |
| 2020/0225673 A1 * | 7/2020 | Ebrahimi Afrouzi | G05D 1/0016 |

* cited by examiner

*Primary Examiner* — Richard M Camby

(57) ABSTRACT

A method for tracking movement and turning angle of a mobile robotic device using two optoelectronic sensors positioned on the underside thereof. Digital image correlation is used to analyze images captured by the optoelectronic sensors and determine the amount of offset, and thereby amount of movement of the device. Trigonometric analysis of a triangle formed by lines between the positions of the optoelectronic sensors at different intervals may be used to determine turning angle of the mobile robotic device.

10 Claims, 1 Drawing Sheet

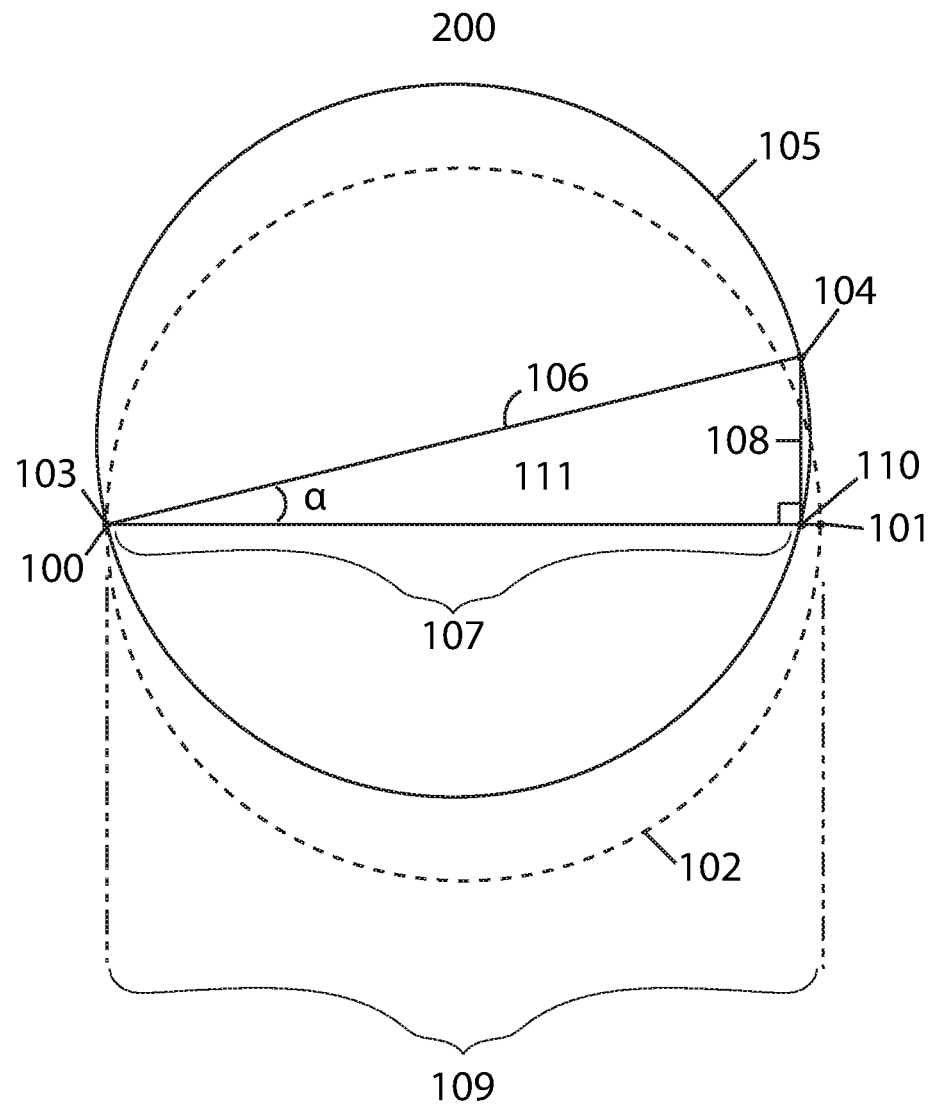

METHOD FOR TRACKING MOVEMENT OF A MOBILE ROBOTIC DEVICE

CROSS-REFERENCE TO RELATED APPLICATIONS

This is a continuation of U.S. patent application Ser. No. 15/425,130 filed Feb. 6, 2017 which is a Non-provisional patent application of U.S. Provisional Patent Application No. 62/299,701 filed Feb. 25, 2016 all of which are herein incorporated by reference in their entireties for all purposes.

FIELD OF THE INVENTION

The present invention relates to methods for tracking movement of mobile robotic devices.

BACKGROUND

Mobile robotic devices are being used with increasing frequency to carry out routine tasks, like vacuuming, mopping, cutting grass, painting, etc. It may be useful to track the position and orientation (the movement) of a mobile robotic device so that even and thorough coverage of a surface can be ensured. Many robotic devices utilize SLAM (simultaneous localization and mapping) to determine position and orientation, however SLAM requires expensive technology that may augment the overall cost of the robotic device. Additionally, SLAM requires intensive processing which takes extra time and processing power. A need exists for a simpler method to track the relative movement of a mobile robotic device.

SUMMARY

According to embodiments of the present invention, two (or more) optoelectronic sensors are positioned on the underside of a mobile robotic device to monitor the surface below the device. Successive images of the surface below the device are captured by the optoelectronic sensors and processed by an image processor using cross correlation to determine how much each successive image is offset from the last. From this, a device's relative position may be determined.

BRIEF DESCRIPTION OF THE DRAWINGS

FIG. 1 illustrates an overhead view of a mobile robotic device with two optoelectronic sensors embodying features of the present invention.

DETAILED DESCRIPTION OF THE INVENTION

The present invention proposes a method for tracking relative movement of a mobile robotic device through optoelectronic sensors.

According to embodiments of the proposed invention, at least two optoelectronic sensors are positioned on the underside of a mobile robotic device such that they monitor the surface upon which the device drives. The two optoelectronic sensors should be positioned on either side (one on a left side and one on a right side) of the underside of the mobile robotic device. Embodiments of the method use digital image correlation to determine the amount that the robotic device has moved in both an x and y direction at the location of both optoelectronic sensors. Digital image correlation is well known in the field, so a detailed description thereof is not provided. As the mobile robotic device moves, the optoelectronic sensors capture images of the work surface and transmit them to a processor. The processor mathematically processes these images using methods such as, cross correlation, to calculate how much each successive image is offset from the previous one. Each optoelectronic sensor has an initial starting location that can be identified with a pair of x and y coordinates. The system can calculate a second location of each optoelectronic sensor by determining the offset amount at each optoelectronic sensor through digital image correlation or by other image processing methods. A second location of each optoelectronic sensor can be identified by a second pair of x and y coordinates.

The offset amounts at each optoelectronic sensor location may be used to determine the amount that the mobile robotic device turned. Referring to FIG. 1, the method for calculating this angle α is illustrated. The initial position of a mobile robotic device 200 with two optoelectronic sensors 100, 101 is shown by the dashed line 102. A secondary position of the mobile robotic device 200 with two optoelectronic sensors 103, 104 after having moved slightly is shown by the solid line 105. Because the secondary position of optoelectronic sensor 103 is substantially in the same position 100 as before the move, no difference in position of this sensor is shown. In real time, analyses of movement will occur so rapidly that a mobile robotic device will only move a small distance in between analyses and only one of the two optoelectronic sensors will have moved substantially. Throughout the remainder of this document, we will be addressing the movement of only one optoelectronic sensor, the one with the greatest amount of movement (and the only substantial amount of movement). We will assume that the other optoelectronic sensor has remained in substantially the same position.

The rotation angle of the mobile robotic device 200 can be represented by the angle α within triangle 111. Triangle 111 is formed by:

the straight line 106 between the secondary positions of the two optoelectronic sensors 103, 104;
the line 108 from the second position 104 of the optoelectronic sensor with the greatest change in coordinates from its initial position to its secondary position to the line 109 between the initial positions of the two optoelectronic sensors that forms a right angle therewith;
and the line 107 from the vertex 110 formed by the intersection of line 108 with line 109 to the initial position 100 of the optoelectronic sensor with the least amount of (or no) change in coordinates from its initial position to its secondary position.

The length of side 106 is fixed because it is simply the distance between the two sensors, which does not change. The length of side 108 may be calculated by finding the difference of the y coordinates between the position of the optoelectronic sensor at position 104 and at position 101. It should be noted that the length of side 107 does not need to be known in order to find the angle α.

The trigonometric function:

$$\sin(\alpha) = \frac{\text{opposite}}{\text{hypotenuse}}$$

only requires that we know the length of sides 108 and 106. After performing the above trigonometric function, we have the angle α, which is the turning angle of the mobile robotic device.

I claim:

1. A method for tracking movement of a robotic device comprising:
    capturing a plurality of images of a driving surface by each of at least two optoelectronic sensors of the robotic device moving within the environment;
    obtaining with one or more processors of the robotic device, a plurality of images by each of the at least two optoelectronic sensors;
    determining, with one or more processors of the robotic device, based on images captured by each of the at least two optoelectronic sensors, linear movement of each of the at least two optoelectronic sensors from a first x, y coordinate position to a second x, y coordinate position, each position given by an x, y coordinate; and
    determining, with one or more processors of the robotic device, rotational movement of the robotic device based on an angle between a first and a third line of a right-handed triangle defined by:
        the first line connecting a first x, y coordinate position of a first optoelectronic sensor and a second x, y coordinate position of a second optoelectronic sensor;
        a second line extending from the second x, y coordinate position of the second optoelectronic sensor towards a line passing through the first x, y coordinate position of the first optoelectronic sensor and a first x, y coordinate position of the second optoelectronic sensor, the line being perpendicular to the second line; and
        the third line connecting the first x, y coordinate position of the first optoelectronic sensor to the second line, the third line being perpendicular to the second line;
    wherein a length of the first line is the distance between the first and the second optoelectronic sensors and a length of the second line is determined by a difference in the first and the second y coordinate position of the second optoelectronic sensor.

2. The method of claim 1, wherein linear movement of the at least two optoelectronic sensors is equal to linear movement of the robotic device.

3. The method of claim 1, wherein determining linear movement of each of the at least two optoelectronic sensors further comprises determining maximum cross correlation between successive images captured by each of the at least two optoelectronic sensors.

4. The method of claim 1, wherein the plurality of images captured by each of the at least two optoelectronic sensors overlap with preceding images captured by each of the at least two optoelectronic sensors.

5. The method of claim 1, wherein the at least two optoelectronic sensors are positioned on opposite sides of an underside of the robotic device.

6. A robotic device comprising:
    a chassis including a set of wheels;
    a motor to drive the wheels;
    a battery to provide power to the robotic device;
    a controller in communication with the motor and wheels to steer movement of the robotic device;
    two or more optoelectronic sensors for capturing a plurality of images of a driving surface of the robotic device; and
    a processor for:
        obtaining the plurality of images by each of the two or more optoelectronic sensors;
        determining, based on images captured by each of the two or more optoelectronic sensors, linear movement of the two or more optoelectronic sensors from a first x, y coordinate position to a second x, y coordinate position, each position given by an x, y coordinate; and,
        rotational movement of the robotic device based on an angle between a first and a third line of a right-handed triangle defined by:
            the first line connecting a first x, y coordinate position of a first optoelectronic sensor and a second x, y coordinate position of a second optoelectronic sensor;
            a second line extending from the second x, y coordinate position of the second optoelectronic sensor towards a line passing through the first x, y coordinate position of the first optoelectronic sensor and a first x, y coordinate position of the second optoelectronic sensor, the line being perpendicular to the second line; and
            the third line connecting the first x, y coordinate position of the first optoelectronic sensor to the second line, the third line being perpendicular to the second line;
        wherein a length of the first line is the distance between the first and the second optoelectronic sensors and a length of the second line is determined by a difference in the first and the second y coordinate position of the second optoelectronic sensor.

7. The robotic device of claim 6, wherein linear movement of the two or more optoelectronic sensors is equal to linear movement of the robotic device.

8. The robotic device of claim 6, wherein determining linear movement of each of the two or more optoelectronic sensors further comprises determining maximum cross correlation between successive images captured by each of the two or more optoelectronic sensors.

9. The robotic device of claim 6, wherein the plurality of images captured by each of the two or more optoelectronic sensors overlap with preceding images captured by each of the two or more optoelectronic sensors.

10. The robotic device of claim 6, wherein the two or more optoelectronic sensors are positioned on opposite sides of an underside of the robotic device.

* * * * *